United States Patent [19]

Rabito et al.

[11] Patent Number: 4,500,606
[45] Date of Patent: Feb. 19, 1985

[54] SEALER FOR POLYESTER AND METHOD OF USE TO OBTAIN LAMINATES

[75] Inventors: Thomas G. Rabito, Ashland; Stephen M. Oswalt, Mansfield; Richard L. Cline, Ashland, all of Ohio

[73] Assignee: Ashland Oil, Inc., Ashland, Ky.

[21] Appl. No.: 552,635

[22] Filed: Nov. 16, 1983

[51] Int. Cl.³ .............................................. B32B 9/04
[52] U.S. Cl. ..................... 428/480; 428/482; 428/483; 428/414; 523/400; 525/58; 525/109
[58] Field of Search ............... 523/400; 428/480, 482, 428/483, 414; 525/58, 109

[56] References Cited

U.S. PATENT DOCUMENTS

| Re. 25,625 | 7/1964 | Been et al. | 525/109 |
|---|---|---|---|
| 3,335,029 | 8/1967 | Holben | 428/483 |
| 3,350,406 | 10/1967 | Meyer et al. | 525/109 |
| 3,725,504 | 4/1973 | Owston | 161/253 |
| 3,812,003 | 5/1974 | Larson et al. | 161/156 |
| 4,246,319 | 1/1981 | Jacobone | 525/109 |
| 4,248,977 | 2/1981 | Wertz | 525/58 |
| 4,254,007 | 3/1981 | Flowers et al. | 525/58 |
| 4,254,231 | 3/1981 | Flowers et al. | 525/58 |
| 4,304,880 | 12/1981 | Flowers | 525/58 |
| 4,379,916 | 4/1983 | Flowers | 525/58 |

FOREIGN PATENT DOCUMENTS

| 2853646 | 6/1980 | Fed. Rep. of Germany | 525/109 |
|---|---|---|---|
| 6616885 | 6/1967 | Netherlands | 525/109 |

*Primary Examiner*—Ronald W. Griffin
*Attorney, Agent, or Firm*—Mary E. Picken

[57] ABSTRACT

A sealer for solid polyester composition to reduce evolution of vapors at temperature 190° C. or higher for 1 hour or more and to improve the bond at these temperatures with isocyanate polyurethane adhesives, epoxy adhesive or acrylic adhesive, the sealer comprising a mixture of 100 to 1000 parts of phenol-formaldehyde resin, 90 to 110 parts of a polyvinyl acetal resin, 10 to 40 parts of epoxy resin, and sufficient solvent to render the mixture brushable, sprayable or flowable.

2 Claims, No Drawings

SEALER FOR POLYESTER AND METHOD OF USE TO OBTAIN LAMINATES

TECHNICAL FIELD

This invention relates to a method of obtaining improved adhesion and heat resistance between plastic substrates and to the resulting bonded substrate or laminate. More specifically this invention relates to a method of treating the surface of substrates such as polyester, polyester containing styrene and related olefins and specifically fiber reinforced plastics. To enhance the heat effectiveness of an isocyanate adhesive, sometimes called a polyurethane adhesive, an epoxy adhesive and an acrylic adhesive, and to seal the surface against gaseous evolution under temperatures of 190° C. and higher for one or more hours exposure.

BACKGROUND

The use of surface treatment of plastic substrates to enhance the bond and product assurance of laminates produced by bonding said treated substrates with a polyurethane adhesive has been the general practice for a decade or more in the automobile industry but recently the industry has required the laminates to withstand heating above 375° F. (190° C.) and trouble has been experienced with the usual laminates due to bond failure, generally at the adhesive substrate interface. It should be noted this effect has been observed with surface primers and paints as heat causes bubbles, pits and related effects. Particularly this is true with the polyester fiber glass impregnated substrates, those most popular being the so-called "low profile" molded polyesters which contain agents such as waxes, block polymers and polyolefins to reduce shrinkage of the plastic from the glass fibers. These polyesters have been discovered to evolve vapors such as styrene, water, and carbon dioxide and other gases at 190° C. for a short time.

DISCLOSURE OF THE INVENTION

We have discovered that the failure of the bond between polyurethane adhesive and plastic substrates at temperatures of 375° F. (190° C.) and higher is due to the evolution of low boiling materials in the plastic and have found that if the surface of the plastic is treated with a suitable protective sealer hereinafter described, the laminate produced with a polyurethane adhesive does not deteriorate during the time required to pass through a paint cure oven at 375° F. (190° C.) usually at least an hours protection at 190° C. is needed under the factory conditions to be sure the adhesive bond does not fail.

The nature of this invention may be more specifically exemplified by the following representative examples wherein all parts by weight unless otherwise indicated and the adhesives are expressed as pounds per square inch.

EXAMPLE 1

A sealer was prepared by blending 100 parts polyvinyl formal resin, 150 parts of phenol-formaldehyde resin B and 20 parts of epoxy resin (Epoxy "Novolak" Resin) and 80 parts of a blend of 50 percent ethylene dichloride, 30 percent toluene and 20 percent ethanol was diluted with additional toluene to give a brushable primer. This sealer was brushed on a clean polyester fiberglass test strip and allowed to dry, typically 15–30 minutes at 120°–170° C. gives best results.

Then an isocyanate adhesive prepared by the procedure of Example IV of U.S. Pat. No. 3,812,003 was applied to the sealer coated polyester fiberglass strips and then the sealed strips were pressed tightly together and allowed to stand overnight before being subjected to a pull test. The laminate failed due to tearing of the substrate. Thus, the sealer in conjunction with the polyurethane adhesive produced a bond between the adhesive and the polyester fiberglass strip stronger than the substrate per se. A laminate prepared without the use of the above described sealer, bus using Forbes primer, broke in the interfaced bond between the adhesive and the strip. Another set of samples were sealed and bonded as described above and placed in 190° C. oven for 1 hour and then removed to stand overnight before being subjected to the pull test. The laminate failed by tearing of the substrate.

More specifically, the polyester compositions useful in this invention are those utilized for constructing panels or built-up objects of substantial rigidity, for instance, the use of polyester compositions containing glass fiber reinforcements such as those used in making automobile bodies or parts, boats, and related objects. These polyester compositions may be made by reacting suitable polycarboxylic acids or their anhydrides with suitable glycols such as ethylene or propylene. For these purposes the polycarboxylic acids of the aromatic type are particularly suitable as they tend to give a more rigid composition, although the aliphatic polycarboxylic acids and anhydrides of 2 to 20 carbon atoms are useful, too. Specific examples of these aromatic polycarboxylic acids are phthalic, isophthalic and terephthalic. Also, unsaturated polycarboxylic acids such as maleic and fumaric are utilized where it is desired to introduce a small to a relatively large amount of unsaturation in the polyester composition, especially where the composition is to be cured or set by peroxide curing either alone or in conjunction with an unsaturated monomer or α-olefin such as styrene or acrylonitrile, etc.

The glass fiber reinforced polyester compositions are well known and are used widely but in general these compositions are prepared by forming a copolymer containing maleic anhydride or related unsaturated polycarboxylic acids and one of the phthalic acids with ethylene glycol.

The polyester compositions of this invention may be laminated or bonded to themselves or with various metals such as aluminum, steel, copper and magnesium.

The isocyanate type adhesive is normally prepared by reacting suitable reactive hydrogen containing material that is polyfunctional with an organic polyisocyanate preferably to form a prepolymer and then the prepolymer is cured with a crosslinking agent such as the organo polyamines or the organic polyols or mixtures of these and in some instances even an atmospheric water cure may be used. The nature of these adhesives are better understood when it is appreciated that tri- and higher functional crosslinking agents given faster curing and in some instances permit the laminates to be prepared without the necessity of subjecting the parts to be adhered to form the laminate to a pressure treatment or combination of pressure and heat treatment to obtain the desired rate of cure and bond level. In general, the adhesive is prepared from reacting about 3.5 to 7.5 and preferably about 4.5 to 6.0 moles of an organic polyisocyanate with each mole of reactive hydrogen containing material having the molecular weight of about 500 to about 4000 and a hydroxyl number of about 20 to 1000 or more, with the preferred range being 50 to 300. Then this reaction product is cured with a suitable amount of polyols such as ethylene glycol, propylene glycol, butane diol, diethylene and triethylene glycols, glycerine, trimethylol propane and trimethylol ethane, tetrols or others. Usually the amount of crosslinker used will be about 1.0 mol with the preferred range being 0.5 to 1.0 mol based on the excess polyisocyanate relative to the reactive hydrogen containing compounds present in the mixtures. In some instances it may be desirable to avoid the prepolymer step and mix all the ingredients in the adhesive in accordance with the one-step method.

The nature of the polyurethane adhesives useful in this invention are those well known to the art and specifically described in U.S. Pat. No. 3,812,003 and generally described as liquid reaction mixture of 30 to 90 parts of an organic polyisocyanates with 100 parts of a polyester polyol or polyether polyol of 700 to 4500 molecular weight with a monomeric nitrogen containing polyol of 3 to 6 hydroxyls.

Suitable solvents for washing the surface of the polyester composition and the metals are those such as methyl ethyl ketone, acetone, ethylene dichloride, methylene chloride, chloroform, toluene, benzene, xylene, the aliphatic hydrocarbons, and coal, tar and petroleum naphthas as well as other chlorinated solvents and naphthas.

EXAMPLE 2

Clean polyester fiberglass strips, at least 1.4 cm × 14.4 cm were coated with the sealer of Example 1 and oven baked at 120° to 150° C. for sufficient time to dry and cure the sealer.

An epoxy adhesive was made by mixing two parts of commercial bis-phenol A/epichlorohydrin reaction product having an epoxy equivalent weight of 190 with a commercial polyamide having an amine equivalent of 140. This epoxy adhesive was spread on the ends of the strips to be bonded for at least one centimeter. Then the strips were laminated by placing the strips together to give 1.2 centimeter overlap in the bond areas and held in this position overnight.

Suitable sealers in accordance with this invention, have been made over a wide range of compositions, for example, as shown below:

| Ingredient | Parts |
| --- | --- |
| Phenol-formaldehyde resin | 100 to 1000 |
| Polyvinyl formaldehyde resin | 90 to 110 |
| Epoxy resin | 10 to 40 |
| Zinc chromate | 0 to 30 |
| Iron oxide | 0 to 70 |
| Solvent | sufficient to render brushable |

The zinc chromate and iron oxide may be omitted from the primer recipe unless resistance to corrosion is desired. The need for corrosion resistance usually is reflected by the requirement that the laminate pass the salt spray test, General Motors Engineering Standards—GM 4298-P (July, 1968, page W-61.101), usually for 240 hours at five percent NaCl spray concentration. Where the salt spray test has to be passed, the amount of zinc chromate and iron oxide is increased to the upper 50 percent of the range. Likewise, as the amount of phenol-formaldehyde resin is reduced below about 5 parts the corrosion resistance decreases, therefore, the amount of zinc chromate and iron oxide is increased to over the midpoint of the range. Fillers such as carbon black, metallic oxides and carbonates can be added for processing or color. Also, as the amount of phenol-formaldehyde resin used exceeds about 800 parts, the flexibility is effected and above 1000 parts, the bend test failure may be experienced.

The example illustrates the practice of this invention using a commercial acrylic monomer-polymer adhesive system activatable with a peroxide catalyst. Adhesives of this type are described by U.S. Pat. No. 3,725,504. These adhesives are generally described as a syrupy paste of 1 to 25 percent of methacrylic acid and from 40 to 85 percent of a solution of an acrylate polymer in methyl methacrylate with a vinyl peroxide catalyst. Optionally, they may contain polychloroprene where quick sets are desired. These acrylic monomer/polymer adhesives are available commercially from many companies and those described specifically in U.S. Pat. No. 3,725,504 are well suited for use in this invention.

The experiment of Example 1 may be repeated with the sealer being modified by replacing the epoxy resin of Example 1 with the reaction product of bis-phenol A and epichlorohydrin having an epoxy equivalent weight of 190 and satisfactory bonding be obtained. Also, representative other epoxy resins useful in this sealer are those described at columns 6 to 9 of U.S. Pat. No. 3,350,406. Also, the epoxy silane resin can be used to give desirable painting surface.

The sealer may be applied by brushing, spraying, dipping or other methods known to the art. Preferably the primer is applied in amounts sufficient to give a coating of 0.012 to 0.03 centimeters when dry, viz. after heating above 120° C. and preferably for about 30 minutes or longer at 135° C.

Although this invention has been illustrated with polyvinyl acetal as the film former and flexibilizer, other well known film forms and flexibilizers can be used, for example, polyvinyl acetate and the butyrals are satisfactory replacements in the above recipes. Also, polyvinyl alcohol, polyvinyl chloride, saturated polyesters and the acrylic resins may be used as a partial or total replacement of the polyvinyl acetal resins.

While certain representative embodiments and details have been shown for the purpose of illustrating the invention, it will be apparent to those skilled in this art that various changes and modifications may be made therein without departing from the scope of the invention.

We claim:

1. A polyester composition laminate having an improved bond between the adhesive, which is one selected from the class consisting of isocyanate, epoxy and acrylic due to the surface of the polyester composition having a seal coat against evolution of gases at 190° C. for one hour, said seal coat comprising a coat of a sealer comprising a mixture of 100 to 1000 parts of a phenol-formaldehyde resin, 90 to 110 parts of a flexibilizer film former selected from the class of resins consisting of polyvinyl acetal, polyvinyl chloride, polyvinyl alcohol, saturated polyesters, polyacrylates, polyvinyl acetates and butyrals and 10 to 40 parts of epoxy resins which were dried at least 10 minutes at a temperature of at least 120° C.

2. The polyester composition of claim 1 which contains the cured product of an unsaturated polyester and styrene.

* * * * *